United States Patent Office 2,895,892
Patented July 21, 1959

2,895,892

PHOTOCHEMICAL PROCESS

Lyman Chalkley, Prince Georges County, Md.

No Drawing. Application August 10, 1954
Serial No. 448,990

9 Claims. (Cl. 204—157)

This invention relates to a photochemical process, and more specifically to one in which the action of light produces color in an approximately colorless system.

The photosensitive system to which the process is applied consists of a two component combination of a heteropolytungstic acid and an oxidizable organic substance. The photochemical process in this system brings about a reduction of the heteropolytungstic acid to a substance that is colored, or that can be converted into a colored material by suitable treatment. There is a simultaneous oxidation of the organic substance. The product of this oxidation may or may not be colored.

The colored reduction product of a heteropolytungstic acid is stable only in absence of air. Oxygen bleaches it to the original colorless heteropolytungstic acid. In absence of air and other oxidizing agents the process proceeds with a progressive increase of color on continued exposure to light, and obeys the reciprocity law over a reasonable range. That is, in a given system a constant color is produced by a fixed exposure measured as the product of time and intensity of light, regardless of how the intensity of the light may vary.

In presence of air those systems whose color on exposure is due only to the reduced heteropolytungstic acid show a very different behavior. The process no longer follows the reciprocity law, and the color produced by light fades again in the dark—the process is phototropic. The fading, which takes place in the light as well as the dark, opposes the photochemical process; and on prolonged exposure to light of constant intensity a constant color is reached that no longer varies with time of exposure and depends only on the intensity of light, assuming temperature and other physical factors to be constant.

This phototropic process has certain novel features and advantages in practice. Thus many of the photosensitive heteropolytungstic acid systems do not color appreciably in ordinary indoor illumination and would not even be suspected of being photosensitive unless they were studied under more intense light. Such systems may be handled freely under ordinary room illumination but give strong colors when exposed to light of greater intensity, such as sunlight or arc light, but when they have been colored by exposure to more intense light the color fades in the dark, and the original colorless photosensitive state is restored. Photographic materials composed of such systems are self restoring. They have an indefinite self life and can undergo the photochemical process repeatedly to give reusable printing out papers, etc. Window curtains sensitized with such systems adjust themselves by the process to the intensity of illumination to which they are exposed. When the intensity is low, as on a dark day, such curtains have little color and admit much light; but when the sun shines on them they become dark and reduce the transmission of light and glare in the interior of the room.

The transient color formed by the phototropic process may be made permanent by suitable treatment. Thus the image on a photographic paper may be toned to give a silver, gold, Prussian Blue or other durable image. Also the latent image produced by an exposure that is too small to have a visible effect may be developed into a fully visible permanent image.

When the organic component of the photosensitive system yields a colored oxidation product, then the process forms a permanent rather than transient color in the system. The process affords a means, for example, of converting colorless products into the brilliantly colored heteropolytungstate toners and lakes of the triphenylmethane and xanthene dyes.

Novel and useful applications of the process are indicated above, and others will become apparent from the examples given below.

The process has a number of advantages over the previous photochemical processes employing the simple tungsten acids. The systems containing tungstic acid are unstable due to the gradual aggregation of the acid into large units and insoluble forms, such as tungstic oxide, which separate more or less completely from the photosensitive mixture. Thus a printing paper sensitized with tungstic acid and, for example, glucose, loses most of its sensitivity on brief storage. The heteropolytungstic acids, on the other hand, do not undergo this change, and the photosensitive systems containing them are indefinitely stable and do not lose their light sensitivity on storage for years. Another advantage lies in the fact that the color formed by the photochemical reduction of tungstic acid is a bright greenish blue, unsuitable for many uses, such as most photographic images. On the other hand, the colored product formed by the process from a heteropolytungstic acid is a cool gray or dark blue suitable for photographic images, neutral tints in draperies and window curtains to reduce glare, etc.

Also the process when applied to oxidizable substances which yield triphenylmethane or xanthene dyes on oxidation has great advantages over previous photochemical processes employing these materials. Thus for examples, paper, cloth, etc., sensitized with, say, the leucobase of malachite green or crystal violet colors on standing in the dark for a few days in presence of air. On the other hand, the heteropolytungstates of these leucobases are stable for at least a year in the dark, and materials sensitized with them have a long shelf life. Another advantage of the present process is that it produces not the simple dyestuff, which is fugitive to light, but instead the much more stable heteropolytungstate toner of the dye.

Heteropolytungstic acids suitable for use in the process are exemplified by silicotungstic acid, $H_4SiW_{12}O_{40}$, borotungstic acid, $H_5BW_{12}O_{40}$, luteophosphotungstic acid, $H_3PW_9O_{31}$, and 12-series phosphotungstic acid, $H_3PW_{12}O_{40}$. Not only the free heteropolytungstic acids but their metal salts may be used in the present invention, and the term "heteropolytungstic acid" is here used generically. It includes both the free acids and their salts in which one or more of the hydrogen ions shown in the formulae above has been replaced by another cation, usually an alkali metal ion. These salts are themselves acid in solution.

Oxidizable organic substances suitable for use in the process fall into the following main classes:

Polyhydric alcohols, exemplified by: ethylene glycol, propylene glycol, glycerine, 2-ethylhexandiol-1, 3, succrose, lactose, dextrine, starch, gum arabic, agar-agar, polyvinyl alcohol, triethanol amine, sorbitol.

Polyethers, exemplified by ethylene glycol diethyl ether, diethylene glycol diethyl ether, tetraethylene glycol dimethyl ether, benzyl cellulose, acetal.

Polyamids, exemplified by "nylon," albumen, casein, gelatine, glue, silk, wool, zein.

Aldehydes, exemplified by formaldehyde, acetaldehyde, n-butyraldehyde, benzaldehyde.

Leucobases of triphenylmethane dyes, exemplified by 4-dimethylamino triphenylmethane, 4,4'-bis-dimethylamino triphenylmethane,4,4',4''-tris-dimethylamino triphenylmethane, 4,4'-bis-diethylamino triphenylmethane.

Leucobases of xanthene dyes exemplified by 3,6-bis-dimethylamino xanthene, 3,6-bis-dimethylamino-9-(2-carboxyethyl) xanthene, 3,6-bis-diethylamino-9-(2-carboxyphenyl) xanthene, 3,6-bis-monoethylamino-9-(2-carboxyphenyl) xanthene ethyl ester.

Suitable oxidizable organic substances may combine two or more of the chemical functions. Examples are, polyethylene glycol of average molecular weight 300, polyethylene glycol of average molecular weight 400, polyethylene glycol of average molecular weight 1500, polyethylene glycol of average molecular weight 4000, which combine the polyether and polyhydric alcohol functions; and glucose, which combines the polyhydric alcohol and aldehyde functions.

Each of the substances mentioned in the above list has been found by trial to be satisfactory as the oxidizable organic component of the system used in the photochemical process.

Color is formed by irradiation of the system of heteropolytungstic acid and oxidizable organic substance. When the process is carried out in absence of oxygen and other oxidizing agents the depth of color formed is related to the intensity of the light by the reciprocity law. In presence of air the depth of color formed in the phototropic systems is uniquely limited by the intensity of the light used. Under these conditions when it is desired to obtain a great depth of color the radiation used in the process should be of high intensity, such as may be obtained from the sun, and from carbon and hot mercury arcs.

With the phototropic systems, effective radiation for the process has a wave length of approximately 4300 A.U. or shorter. The systems employing the leucobase of a dye as the oxidizable organic component may be colored by irradiation with 4300 A.U. and shorter, and they may also have a longer wave sensitivity, depending on the specific leuco base employed. Thus the systems containing 4-dimethylamino triphenylmethane may be colored by light of as long wave length as 5000 A.U., while systems containing 3,6-bis-diethylamino-9-(2-carboxyphenyl) xanthene are sensitive into the orange part of the spectrum.

The process will be made clearer by the following examples:

*Example 1*

One volume of a 5% aqueous solution of triethanol ammonium chloride is mixed at room temperature with 2 volumes of 15% aqueous solution of phosphotungstic acid, $H_3PW_{12}O_{40}.11H_2O$. The precipitate is collected on a filter and dried in the dark to form a phototropic pigment. The dry solid is exposed to sunlight to produce a change from colorless to gray or black. On storage in the dark in presence of air the color fades, leaving again a colorless pigment which in turn can be put through the photochemical process. This cycle may be repeated a considerable number of times. Lacquers, paints and printing inks made up with the pigment can be used equally well in the photochemical process.

*Example 2*

One volume of a 20% aqueous solution of polyethylene glycol of average molecular weight 4000 is mixed with 1 volume of a sodium borotungstate solution containing 0.5 gram atom of tungsten per liter, and 1 volume of normal hydrochloric acid. Water leaf paper is sized with this solution and dried in the dark to form a phototropic printing material. The dry paper is exposed to the radiation from a hot mercury arc lamp to produce a change from colorless to bluish gray or black. The color fades in the dark in presence of air, and the process may be repeated. The rate of fading and the depth of color attained on prolonged exposure to light of constant intensity vary markedly with the water content of the polyethylene glycol. Thus the speed and results of the photochemical process can be varied over a considerable range by control of the relative humidity of the atmosphere to which the sensitized paper is exposed.

*Example 3*

One volume of a 1% aqueous solution of potassium luteophosphotungstate ($K_3PW_9O_{31}.7H_2O$) is mixed with 1 volume of 10% aqueous solution of polyvinyl alcohol (Elvanol 72–51) to a homogeneous solution. Water leaf paper is wet with this solution and dried in the dark. The dried paper prints in sunlight to give a deep blue image. In the dark in presence of air the image fades at room temperature slowly over a period of many days. The faded paper can be printed on again.

*Example 4*

White nylon cloth is boiled for 5 minutes in sufficient 1.25% aqueous silicotungstic acid, $H_4SiW_{12}O_{40}$, to cover the cloth well. The cloth is then rinsed in cold water and dried in the dark. Wrinkles may be removed by stretching while drying or ironing after drying. The appearance of the cloth is little changed by the sensitizing, but on exposure to light it develops a gray color that varies in depth with the intensity of the light, fading again to white when kept in the dark.

*Example 5*

Plain gelatine coated photographic paper stock is immersed at 80° C. in a 2½% aqueous solution of phosphotungstic acid, $H_3PW_{12}O_{40}$, and bathed for 5 minutes with the hot solution. The paper is then removed, rinsed with water, and dried in the dark face down on a waxed glass plate to give a glossy finish. The product is a reusable photographic printing out paper. When exposed behind a negative to sunlight a cool gray or black positive image prints out. In the dark at room temperature the image fades in 24 to 48 hours, and the paper can be printed on repeatedly.

*Example 6*

Water leaf paper is wet with a solution of 10 g. of phosphotungstic acid, $H_3PW_{12}O_{40}\cdot 11H_2O$, and 10 g. of sorbitol in 90 ml. of water, and dried in the dark. On exposure to a hot mercury arc behind a negative a rather light gray positive phototropic image prints out which can be made permanent by toning by one of the following methods:

(*a*) *Silver*.—The paper immediately after printing is bathed for 5 minutes at room temperature with 1/20 molar silver nitrate solution, rinsed in water, fixed for 5 minutes in N/2 ammonium hydroxide solution, washed for 10 minutes in running water and dried in the air. The toned image is darker than the original phototropic print, and is permanent.

(*b*) *Gold*.—The paper immediately after printing is wet with a 3% aqueous chlorauric acid solution, let stand for 10 minutes at room temperature, washed for 2 minutes in running water, fixed for 10 minutes in a 2% aqueous solution of sodium carbonate, washed for 10 minutes and dried. The resulting purple image is permanent.

(*c*) *Prussian Blue*.—The printed paper is bathed with a freshly prepared aqueous solution containing 1% of ferric ammonium citrate and 1% of potassium ferricyanide until the image has changed from gray to bright blue. The paper is then washed in running water for 10 minutes and dried. The image is as permanent as a blue print.

*Example 7*

Water leaf paper is wet with an aqueous solution containing 2.5% of phosphotungstic acid, $H_3PW_{12}O_{40}.11H_2O$, and 2.5% of glucose, and dried and stored in the dark. This paper is printed for 20 seconds at an intensity of 280 microwatts per square centimeter of 3650 A.U. radiation from a hot mercury arc lamp. No visible image is formed by this exposure. Immediately after printing the image is developed in red light by the following sequence of treatments: N/20 silver nitrate solution for 5 minutes, rinse in water for 3 minutes, bathe in a solution of 1.1 g. potassium iodide and 2.7 g. of sodium sulfite in water to 100 ml. for 3 minutes, rinse in water for 1 minute, develop for 1 hour at 20° in a solution of 2 g. sodium sulfite, 0.33 g. silver nitrate, 3.2 g. sodium thiosulfate and 0.16 g. of 2,4-diaminophenol dihydrochloride in water to 100 ml., rinse for 1 minute, fix for 10 minutes in 20% sodium thiosulfate, wash for 10 minutes and dry. A permanent silver image is obtained.

*Example 8*

Ten grams of high viscosity polyvinyl alcohol (Elvanol 72–51) is moistened at room temperature with a solution of 5 g. of phosphotungstic acid, $H_3PW_{12}O_{40}.11H_2O$, in 50 ml. of water. The mixture contained in a closed flask is heated in a boiling water bath until a clear solution is formed, which requires 1 to 2 hours.

The solution is poured onto a level glass plate and allowed to dry in the dark in dust free air. The dry film may be left on the glass plate or stripped from the glass and used alone.

The film is exposed to light from a carbon arc to print a cold black image which fades only very slowly in the dark at room temperature, requiring several months to bleach completely in air.

*Example 9*

Water leaf paper is wet with a 5% solution of 4-dimethylamino triphenylmethane in toluene and dried. With illumination from a red safelight the paper is immersed in 2.5% phosphotungstic acid, $H_3PW_{12}O_{40}$, in N/100 aqueous hydrochloric acid and let stand in this solution in the dark at room temperature for 20 hours. The paper is then air dried. It should be handled by a red safelight and stored in the dark. The paper is exposed to incandescent lamp light to print a reddish orange, permanent, image. The process is useful in the actinometry of wave lengths shorter than 5000 A.U.

*Example 10*

A 4% solution of Pyronine G in 14% aqueous sulfuric acid is treated in the dark or a very weak blue-green light with 5% of its weight of zinc dust and shaken well at room temperature for 5 minutes or until all the dye has been reduced to leucobase. The solution is then filtered through a dense filter paper. All the zinc dust should be retained by the paper. The filtrate is allowed to run directly into an equal volume of 20% aqueous phosphotungstic acid, $H_3PW_{12}O_{40}$. As soon as the solutions have been mixed there is added one half of their volume of a 20% aqueous barium chloride solution. The mixture is thoroughly stirred and allowed to stand at room temperature for 24 hours. The precipitate is then collected on a filter, washed with N/1000 hydrochloric acid and dried and stored in the dark. The resulting pigment is colored magenta by exposure to ultraviolet and most of the visible spectrum. The process is especially useful when the pigment is incorporated in printing ink, lacquer, etc.

*Example 11*

One gram of Rhodamine B is dissolved in 100 ml. of water. One gram of zinc dust and 4 ml. of concentrated hydrochloric acid are added rapidly and the solution stirred vigorously and warmed to 50° C. until all the dye has been reduced to the leucobase including any particles that may have initially been precipitated by the acid, and a light colored clear solution is obtained. The following preparative operations are carried out in the dark. The warm solution is filtered rapidly through a retentive filter paper—all zinc dust must be removed from the filtrate. To the filtrate is immediately added a solution of 4 g. of phosphotungstic acid, $H_3PW_{12}O_{40}.22H_2O$, and 3 g. of sulfuric acid in 50 ml. of water heated to 50° C. As soon as this solution is added an additional solution of 5.2 g. of barium chloride dihydrate in 25 ml. of water heated to 50° is added and the whole well mixed. The mixture is allowed to stand for 2 hours while cooling to room temperature. The precipitate is collected on a filter, washed with N/1000 hydrochloric acid, and while still moist mixed with a 5% aqueous solution of gum arabic. The resulting mixture is used to size water leaf paper, which is dried and stored in the dark.

The paper is exposed to daylight to print a brilliant magenta image. The process is exceptionally fast for a printing out paper.

*Example 12*

Water leaf paper is wet with a 1% solution of 4,4'-bis-dimethylamino triphenylmethane in toluene and dried in the dark. As soon as dry the paper is immersed in a 1.5% aqueous solution of phosphotungstic acid, $H_3PW_{12}O_{40}.11H_2O$, and allowed to stand in this solution in the dark at 25° C. for 24 hours. The paper is then air dried in the dark at room temperature and subsequently handled by a yellow safe light.

The paper is printed behind a negative by sunlight. A rather weak degraded greenish or brownish positive image prints out. The print is developed by bathing for 10 minutes at room temperature in a 2% aqueous solution of sodium bicarbonate. In the development the color of the printed out image changes to the brilliant green of malachite green phosphotungstate pigment. The developed print is washed for 5 minutes in running water, fixed for 10 minutes in N/10 hydrochloric acid, washed for 5 minutes and dried to give a permanent finished green picture. An alternative method of fixing the image is to extract the developed and washed print with toluene or benzene until a portion of the extract no longer leaves a residue on evaporation of the solvent.

The above examples illustrate the practice of the invention and widely varied applications. Many other applications will occur to these skilled in the art, and it is obvious that various changes may be made in the specific details of the invention without departing from the spirit and scope thereof.

I claim:

1. The photochemical process comprising the steps of providing an intimate mixture of a heteropolytungstic acid with a carbonaceous reducing agent chosen from the group consisting of polyhydric alcohol, polyether, polyamid, aldehyde, leucobase of triphenylmethane dye, leucobase of xanthene dye and irradiating said mixture with light to produce a chemical reaction between the heteropolytungstic acid and the carbonaceous reducing agent and thereby forming a colored product.

2. The process of claim 1 wherein said heteropolytungstic acid is phosphotungstic acid.

3. The process of claim 1 wherein said heteropolytungstic acid is silicotungstic acid.

4. The process of claim 1 wherein said heteropolytungstic acid is borotungstic acid.

5. The photochemical process comprising the steps of providing an intimate mixture of a heteropolytungstic acid chosen from the group consisting of phosphotungstic acid, silicotungstic acid and borotungstic acid with a carbonaceous reducing agent chosen from the group consisting of polyhydric alcohol, polyether, polyamid, aldehyde, leucobase of triphenylmethane dye, leucobase of xanthene dye and irradiating said mixture with light to produce a chemical reaction between the heteropolytungstic acid and the carbonaceous reducing agent and thereby forming a colored product.

6. The photochemical process comprising the steps of providing an intimate mixture of a heteropolytungstic acid with a polyhydric alcohol and irradiating said mixture with light to produce a chemical reaction between the heteropolytungstic acid and the polyhydric alcohol and thereby forming a colored product.

7. The process of claim 6 wherein said polyhydric alcohol is polyvinyl alcohol.

8. The process of claim 6 wherein said polyhydric alcohol is sorbitol.

9. The process of claim 6 wherein said polyhydric alcohol is glucose.

References Cited in the file of this patent

UNITED STATES PATENTS 1,934,451 Sheppard et al. ---------- Nov. 7, 1933

FOREIGN PATENTS 13,736 Great Britain ---------------- 1907

670,883 Great Britain ---------- Apr. 30, 1952

OTHER REFERENCES

Mellor: Comprehensive Treatise on Inorganic and Theoretical Chemistry, vol. 11 (1931), Longmans, Green and Co., N.Y., pages 770 and 771. Copy in Div. 59.

Mellor: Comprehensive Treatise on Inorganic and Theoretical Chemistry, vol. 11 (1931), Longmans, Green and Company, N.Y., page 767. Copy in Scientific Library.

Mellor: Comprehensive Treatise on Inorganic and Theoretical Chemistry, vol. 11 (1931), Longmans, Green and Company, N.Y., pages 768 and 769. (Copy in Div. 59.)